United States Patent
Luther et al.

(10) Patent No.: US 11,758,466 B2
(45) Date of Patent: Sep. 12, 2023

(54) DISTRIBUTED ROUTING ELECTIONS

(71) Applicant: Quixotic Holdings, LLC, Fife, WA (US)

(72) Inventors: Ryan Scott Luther, Lakeland, FL (US); Anthony Samuel Jacobs, Olney, MD (US); Charles Robert Gorectke, Lakeland, FL (US); Christopher Michael Garman, Pittsburgh, PA (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 25 days.

(21) Appl. No.: 17/489,437

(22) Filed: Sep. 29, 2021

(65) Prior Publication Data

US 2023/0096395 A1    Mar. 30, 2023

(51) Int. Cl.
   *H04W 40/32* (2009.01)
   *H04W 84/18* (2009.01)

(52) U.S. Cl.
   CPC ............ *H04W 40/32* (2013.01); *H04W 84/18* (2013.01)

(58) Field of Classification Search
   None
   See application file for complete search history.

(56) References Cited

U.S. PATENT DOCUMENTS

| | | | |
|---|---|---|---|
| 8,570,861 B1 * | 10/2013 | Brandwine | H04L 45/70 370/230 |
| 8,614,997 B1 * | 12/2013 | Herder | H04W 40/026 370/338 |
| 9,137,670 B2 | 9/2015 | Gray et al. | |
| 9,198,118 B2 | 11/2015 | Larue et al. | |
| 9,209,991 B1 * | 12/2015 | Tillman | H04L 47/70 |
| 9,413,772 B2 | 8/2016 | Zeng et al. | |
| 9,648,544 B1 * | 5/2017 | Arshad | H04W 76/14 |
| 10,027,703 B2 | 7/2018 | Zeng et al. | |
| 10,178,509 B1 | 1/2019 | Perdew et al. | |
| 10,419,103 B1 * | 9/2019 | Perdew | H04L 45/02 |

(Continued)

FOREIGN PATENT DOCUMENTS

CN    101383717 B  *  5/2011  ........... H04L 12/185

OTHER PUBLICATIONS

Mills et al., "Network Time Protocol Version 4: Protocol and Algorithms Specification," *Internet Engineering Task Force*, Jun. 2010, 95 pages.

(Continued)

*Primary Examiner* — Kenny S Lin
(74) *Attorney, Agent, or Firm* — Seed IP Law Group LLP

(57) ABSTRACT

A facility for operating a first node in a mesh network having other nodes is described. The first node directly receives signals each encoding an identifier of one of the other nodes, at least a portion of the signals also encoding an indication that the node having the identifier has appointed itself a routing node. The facility determines a first value equal to the number of unique node identifiers encoded in signals received during a first period of time, and a second value equal to the number of unique node identifiers encoded by signals received during the first period of time that also encode the indication. The facility determines a routing score for the first node based at least upon the first value and the second value that reflects the first node's suitability as a routing node in the mesh network.

15 Claims, 11 Drawing Sheets

(56) References Cited

U.S. PATENT DOCUMENTS

| | | | |
|---|---|---|---|
| 10,542,035 B2 | 1/2020 | Zeng et al. | |
| 11,316,700 B1 * | 4/2022 | Michaelis | H04L 9/3255 |
| 2003/0202479 A1 * | 10/2003 | Huang | H04W 40/04 |
| | | | 370/254 |
| 2008/0052763 A1 | 2/2008 | Hum et al. | |
| 2011/0164527 A1 * | 7/2011 | Mishra | H04L 45/308 |
| | | | 370/252 |
| 2016/0037469 A1 * | 2/2016 | Smith | A63F 13/35 |
| | | | 370/312 |
| 2018/0302432 A1 | 10/2018 | Zeng et al. | |
| 2020/0344217 A1 | 10/2020 | Luther et al. | |

OTHER PUBLICATIONS

Mills, "Internet Time Synchronization: The Network Time Protocol," *IEEE Transactions On Communications*, 39(10): 1482-1493, Oct. 1991.

Mills, David L., Computer Network Time Synchronization: The Network Time Protocol, CRC Press Taylor & Francis Group, LLC, Boca Raton, FL, 2006, 311 pages.

\* cited by examiner

| Participant Identifier | Individual Participant Information |||| Other Participants that are within Line-of-Sight ||||||
| --- | --- | --- | --- | --- | --- | --- | --- | --- | --- | --- |
| | Kinematics | Spectrum Capabilities | Timestamp | Routing Score | Line-of-sight Participant Identifier | Quality of Signal | Frequency Capability | Spectrum Capability | Routing Score | Signal to Noise Ratio | Weighted Value Between Pair |
| C | | | | | A | | | | | | |
| | | | | | B | | | | | | |
| E | | | | | F | | | | | | |
| | | | | | G | | | | | | |

*FIG. 3*

(128: Participant Identifier; 130: Kinematics; 131: Spectrum Capabilities; 132: Timestamp; 133: Routing Score; 134: Line-of-sight Participant Identifier; 136: Quality of Signal; 138: Frequency Capability; 140: Spectrum Capability; 141: Routing Score; 142: Signal to Noise Ratio; 144: Weighted Value Between Pair; 122: Individual Participant Information; 124: Other Participants that are within Line-of-Sight; 120: table; 126a, 126b: rows; 148a–148d: rows)

DISTRIBUTED ROUTING ELECTIONS

BACKGROUND

Mobile communication devices such as smart phones have become an integral part of the lives of many people; the number of mobile communication devices in use continues to grow. These mobile communication devices are powerful computers that can connect via various data paths and protocols.

It is typical for mobile communication devices to connect with the Internet and each other by communicating directly with cellular base stations or wireless access points.

BRIEF DESCRIPTION OF THE DRAWINGS

FIG. 3 illustrates an example participant table 120 that tracks participants in the cognitive heterogeneous ad hoc mesh network in accordance with embodiments described herein.

DETAILED DESCRIPTION

Figure 1A:
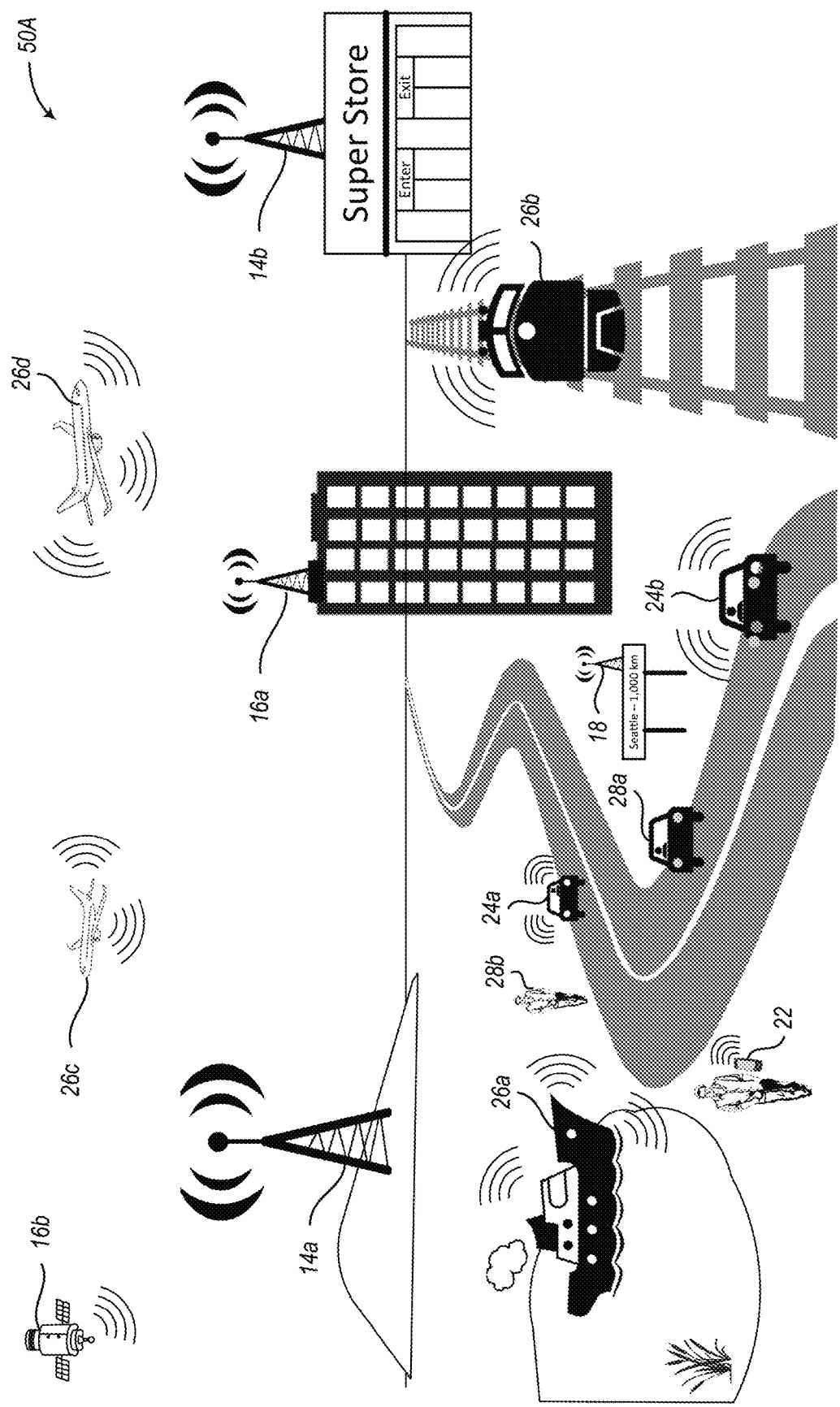
FIGS. 1A-1B illustrate context diagrams of an environment for establishing an ad hoc mesh network in accordance with embodiments described herein.

The inventors have recognized that the conventional approach in which mobile communication devices only communicate directly with cellular base stations or wireless access points is unnecessarily limiting. For example, there are geographic locations where no cellular base stations or wireless access points are permanently sited, or otherwise consistently operating. Additionally, under some conditions, cellular base stations and wireless access points (collectively referred to as "base stations" below) can become disabled, or their performance can be limited in a way that reduces their range and/or bandwidth. For example, base stations can become performance-limited or disabled by power outages or reductions, breaks in wired network links upon which they depend, failure of hardware or software components, adverse weather, natural disasters, human conflicts, or intentional sabotage.

In response to recognizing this disadvantage of conventional mesh networking, the inventors have conceived a software and/or hardware facility for operating ad hoc mesh networks—such as mesh networks in which mobile communication devices ("network participants, "mobile participants," or "participants") communicate directly with one another, and thus also referred to herein as "peer networks". In the network mesh that results from direct communication among network participants, the facility operates a routing scheme in which certain network participants are identified as routing participants that maintain more extensive information about the ad hoc network and its status than do the other participants in the network and perform routing responsibilities for the network. In various embodiments, the mesh networks operated by the facility are wireless networks, line-of-sight networks of other types, or wired or guided networks.

In some embodiments, the facility maintains a "routing score" metric for some or all of the network participants in an ad hoc network. The routing score reflects each network participant's relative level of suitability for operating as a routing participant on behalf of the network. In some embodiments, each network participant determines its own routing score, based on the number of other present participants in the network that it has demonstrated it is capable of direct communications, and the number of these that are routing participants. In various embodiments, each network participant's routing score further reflects one or more additional factors relating to the participant that have a correlation with suitability as routing participant, such as any group of: data throughput, radio power level, CPU capability and utilization level, amount of available transient or persistent storage space, battery size and status, and number of hops from the participant to a connection to the Internet. In some embodiments, the facility also bases a participant's routing score or one or more factors relating to the participant's connections to other participants; including for example the following factors as determined by the participant with respect to its connections to other participants: signal-to-noise ratio, data collision rate, RF interference level, duty cycle, and received signal strength indication. In view of the dynamic nature of each ad hoc network, their participants continuously or periodically reassess their routing scores.

In some embodiments, the facility uses the routing scores of participants in an ad hoc network to assign routing participant status to one or more of the participants. The participants in the network exchange their routing scores. In some embodiments, the participant having the highest score appoints itself a routing participant. In some embodiments, additional participants appoint themselves routing participants, such as to ensure that each participant in the network is within a certain number of hops of a routing participant, which can include one hop. Here too, where there are choices among participants that would satisfy this condition, one of these participants identifies itself as a routing participant based upon having the highest routing score among these participants.

In some embodiments, each of the participants maintains a participant table storing information about at least some of the participants in the network. In some embodiments, participants that are not routing participants maintain participant tables that contain information about a relatively small number of participants in the network, such as the participants that can be reached in one hop, or the participants that can be reached in two hops. In contrast, routing participants maintain participant tables that contain information about a larger number of participants in the network, such as the participants that can be reached in three, four, or five hops, or all of the participants in the network.

In some embodiments, participants send messages for unknown network participants, or nodes beyond the network, to one or more routing participants.

In some embodiments, routing participants report certain information about the ad hoc network to other routing participants, forming a hierarchy of routing participants. This can include partial or full contents of their participant tables, statistical information about the network and its operation, etc.

As noted above, in some embodiments, each participant periodically reevaluates its routing score, which can result in a participant that is not a routing participant appointing itself routing participant, or a participant that is a routing participant withdrawing its routing status. In some cases, certain participants that are routing participants withdraw their routing status when they recognize limitations on their routing capabilities, such as diminished resources, traffic overload, actual or anticipated security failure, etc. A routing participant that withdraws its routing status typically communicates this to some or all of the participants in the network. In some embodiments, the participants that receive this communication each consider whether they should appoint itself routing participant, based upon the routing scores of the remaining participants.

By operating in some or all of the ways described above, the facility efficiently assigns and adjusts routing participant responsibilities in a manner responsive to changes in the ad hoc network—including the arrival, movement, departure, and performance of participants, and changes in traffic—without relying upon management from outside the network, or incurring the overhead of every participant serving as a routing participant.

Also, the facility improves the functioning of computer or other hardware, such as by reducing processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, the facility conserves processing and storage resources among network participants that would be required for every participant to operate as a routing participant. Also, the facility conserves processing resources that would be used in a remote server to manage the assignment of routing responsibility among the participants in the network, and communication capacity of the participants and other nodes intermediate to the remote server that would be needed to exchange this information with the remote server.

As referred to herein, a "participant" is an object that includes a computing device that can communicate specific, predetermined types of information and data to other participant objects via wireless or other communications means. In some embodiments, each participant may be a member of a universal service-level agreement to identify which objects are participants, which allows for participants to communicate with one another without having to get user authorization for each individual connection between participants.

As discussed in more detail herein, participants can be mobile or stationary and may include computing devices of different sizes having different computing or networking capabilities. Throughout this disclosure, the term "participant" is used interchangeably with "participant object" and "participant computing device" and "node" and other related variations, and the term "non-participant" is used interchangeably with "non-participant object" and other related variations.

As referred to herein, "line-of-sight communication" refers to wireless or wired transmission of information from a participant to another participant without other retransmission devices. A line-of-sight communication may also be referred to as a single hop from one participant to another participant or a direct communication between participants. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

Figure 1B:
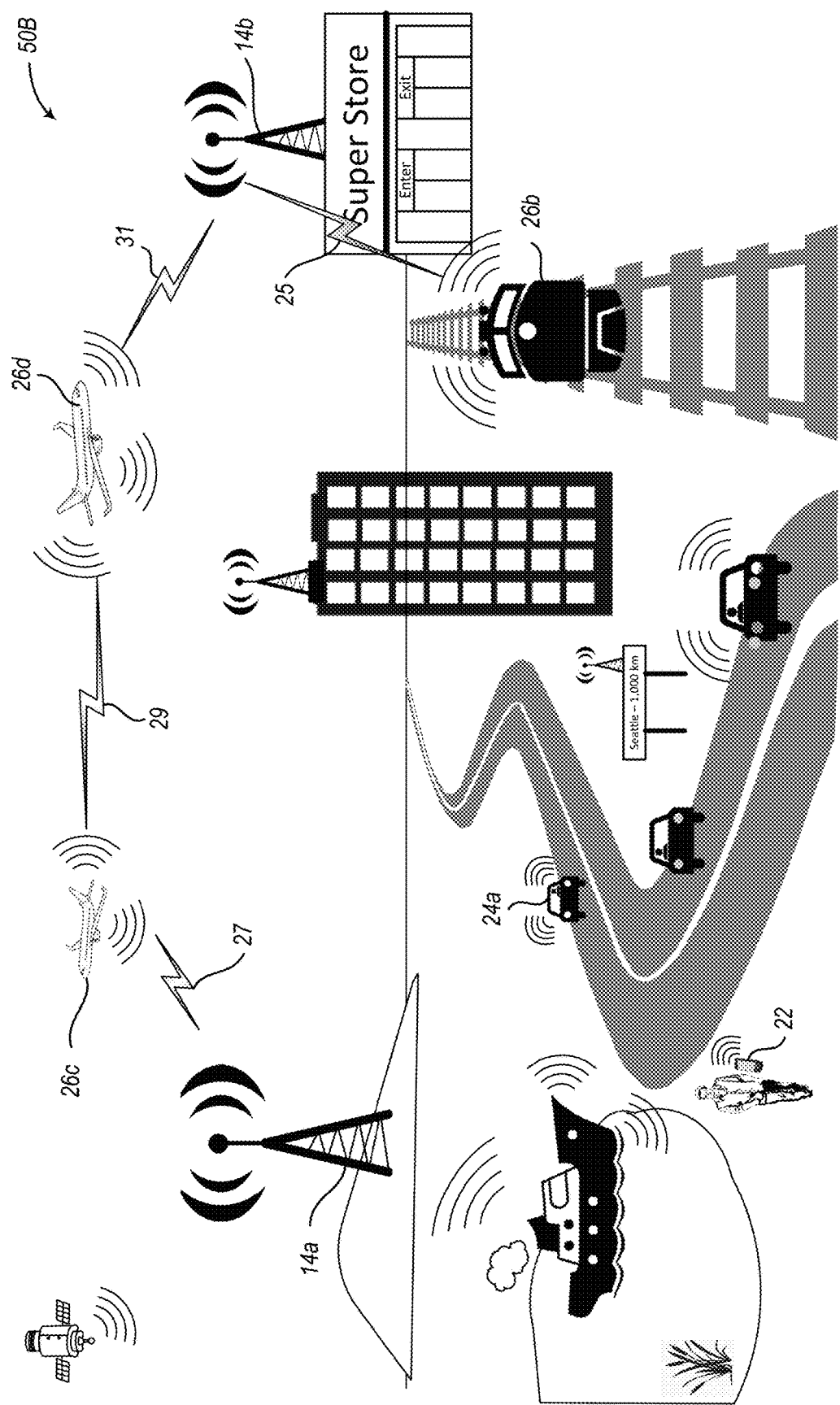

FIGS. 1A-1B illustrate context diagrams of an environment for establishing an ad hoc mesh network in accordance with embodiments described herein. In various embodiments, the facility may implement some or all embodiments described herein with respect to generating and maintaining the ad hoc mesh network. Environment 50A in FIG. 1A includes a plurality of mobile participants (referenced in some figures as mobile participants 36), a plurality of stationary participants (referenced in other figures as stationary participants 34), and a plurality of non-participants 28. As mentioned above, the stationary participants and the mobile participants can communicate specific types of information or data with one another, but cannot communicate the same types of information with the non-participants 28.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, the size or type or accuracy of the antenna utilized, etc.

For example, tier 1 mobile participants 22 typically have the smallest available power, lowest processing power, lowest bandwidth, shortest ranged antenna, lowest power output, lowest accuracy, and slowest update rate. Examples of tier 1 mobile participants 22 include, but are not limited to, mobile phones, laptop computers, tablet computers, wearable computing devices, or other smaller, low power, low transmission mobile computing or Internet-Of-Things devices. In the example illustrated in FIG. 1A, there is only a single tier 1 mobile participant 22, which happens to be a mobile phone in this example. However, other numbers and types of tier 1 mobile participants 22 may also be employed.

Tier 2 mobile participants 24 typically have medium power constraints, a medium amount of processing power, medium bandwidth, medium range capabilities, medium accuracy, and medium update rate. Examples of tier 2 mobile participants 24 include, but are not limited to, automobiles, small personal boats, personal aircrafts, or other medium power, medium transmission, power regenerating mobile computing devices or objects that can support such mobile computing devices. FIG. 1A illustrates example tier 2 mobile participants 24 as including automobiles 24*a* and 24*b*. However, other numbers and types of tier 2 mobile participants 24 may also be employed.

Tier 3 mobile participants 26 typically have the largest available power, highest processing power, highest bandwidth, longest transmit and receive capabilities, highest accuracy, and fastest update rate among mobile participant computing devices. Example tier 3 mobile participants 26 include, but are not limited to, commercial airline planes, semi-trucks, cargo ships, trains, or other objects that can support larger, high power, high transmission mobile computing devices or objects that can support such mobile computing devices. FIG. 1A illustrates example tier 3 mobile participants 26 as including boat 26a, train 26b, and airplanes 26c and 26d. However, other numbers and types of tier 3 mobile participants 26 may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data request from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18. In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As described in greater detail below, the mobile and stationary participants communicate with one another to pass information from one participant to another, which is further illustrated in FIG. 1B.

Environment 50B in FIG. 1B provides additional details regarding environment 50A in FIG. 1A, and likewise includes a plurality of mobile participants, a plurality of stationary participants, and a plurality of non-participants. Participants can communicate with other participants or with non-participants by forwarding communications between participants. Each participant utilizes a locally stored participant table to determine a next participant in which to send communications along an optimum route between the sending participant and the destination device, which is described in more detail below.

Briefly, however, in this example, participant airplane 26c is attempting to communicate with participant train 26b. If participant airplane 26c is within line-of-sight of train 26b, then the two participants could communicate directly with one another. But if airplane 26c cannot directly communicate with train 26b, then airplane 26c will communicate with train 26b via other participants.

Airplane 26c utilizes a participant table to identify one or more routes from airplane 26c to train 26b via zero, one, or a plurality of other participants. Creation and update of the participant table is discussed in more detail below.

In some embodiments, each participant that forwards a communication message may modify the additional route information to remove route information for previous participants along the route, which allows subsequent participants to transmit less and less data for each hop along the route. In other embodiments, the additional route information is maintained so that the destination participant knows the route of the messages and can reuse the same route to transmit return messages to the originally sending participant, or the destination can recalculate a new route.

In some embodiments, a participant along the route may determine that it should re-calculate a route from that participant to the destination participant. In one embodiment, this determination may be based on the participant not being able to transmit messages to the next participant identified in the additional route information included with the messages, such as if the participant and the identified next participant are no longer in line-of-sight communication with one another. In another embodiment, the participant may re-calculate the route if the connection between the participant and the next participant has significantly deteriorated, e.g., the individual score between that corresponding participant pair has exceeded a threshold value. In one example, the individual score may change based on a system limitation of the participant or the next participant, such as if Doppler effects between the participant and the next participant exceeds a threshold value based on the antenna capabilities of the participant and the next participant. For the illustrated example, tower 14*a* may perform similar actions as airplane 26*c* by using the participant table to determine a next participant in which to forward the messages destined to train 26*b*.

In these examples, the communication links 25, 27, 29, and 31 are line-of-sight communication transmissions from one participant computing device to another. As described elsewhere herein, these transmissions may be non-directional transmissions or they may be directional transmissions.

Even though FIGS. 1A and 1B are illustrated with stationary participants, the line-of-sight communications described herein enables mobile participants to communicate with one another without having to be in line-of-sight communication of a stationary participant, which reduces the need for a complex stationary infrastructure. Moreover, embodiments described herein enable mobile participants to communicate with one another even if the stationary participants become unavailable or if wired communication networks between stationary participants become interrupted. Moreover, the stationary participants can communicate with other participants without the need for specialty hardware for different cellular carriers or networks, rather it can rely on common line-of-sight wireless protocols, such as Wi-Fi technology under the IEEE 802.11 standards, as well as ad hoc protocols now known or developed in the future.

As mentioned above, each participant can select another participant through which it can forward communication messages based on a participant table. The participant table identifies each participant, where each participant is located, how each participant is moving, which participants are within line-of-sight of each other, and various different characteristics or communication capabilities between line-of-sight participants. Creating, updating, and using the participant table is described below, and one example participant table is illustrated in FIG. 3.

The overarching ad hoc mesh network created by the mobile and stationary participants described above in conjunction with FIGS. 1A-1B provides a backbone for a multi-layered network that enables one participant to communicate with another participant, while also providing safety measures to avoid collisions among participants and non-participants.

Figure 2A:
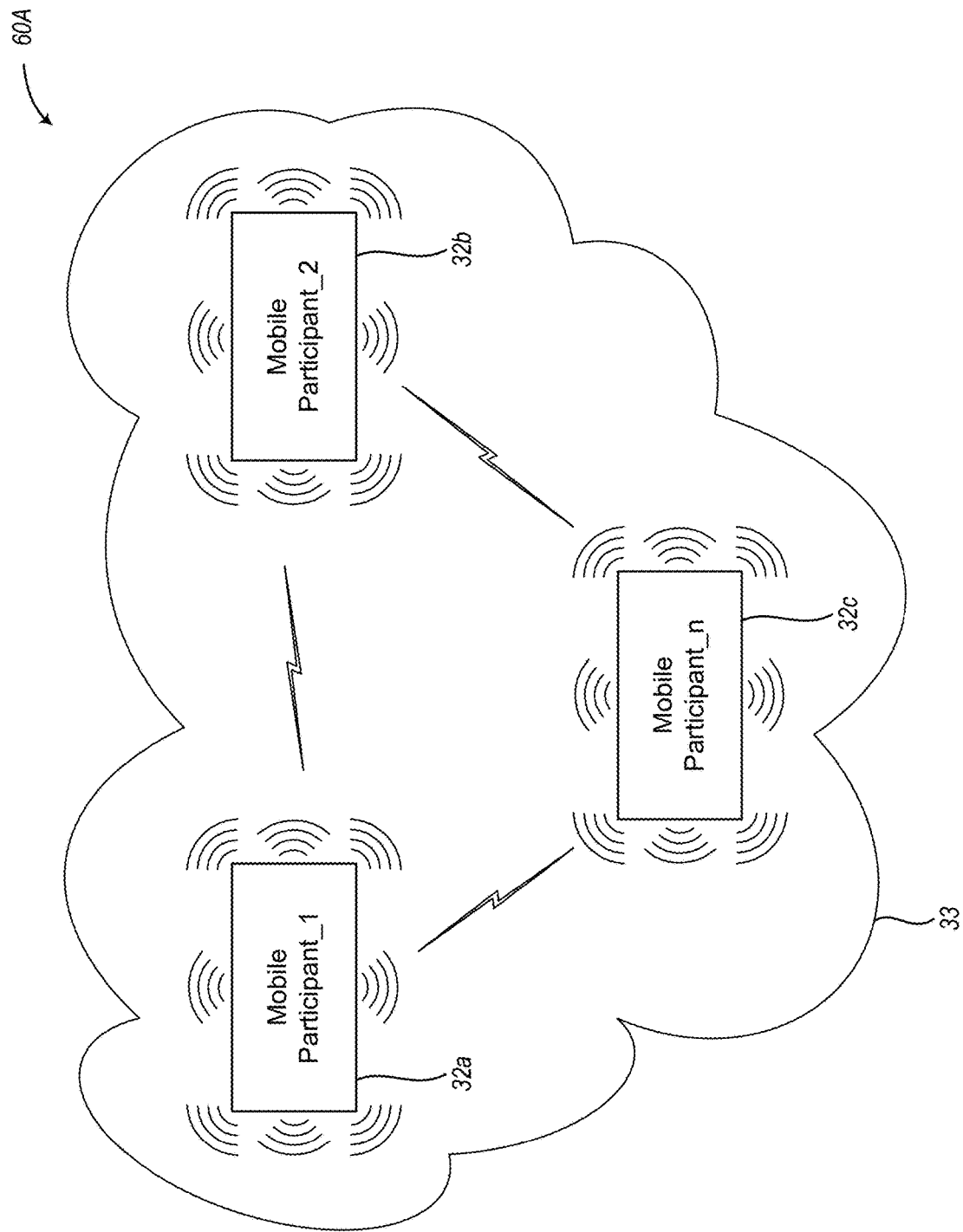
FIGS. 2A-2B illustrate block diagrams of the different layers of the ad hoc mesh network in accordance with embodiments described herein.
Figure 2B:
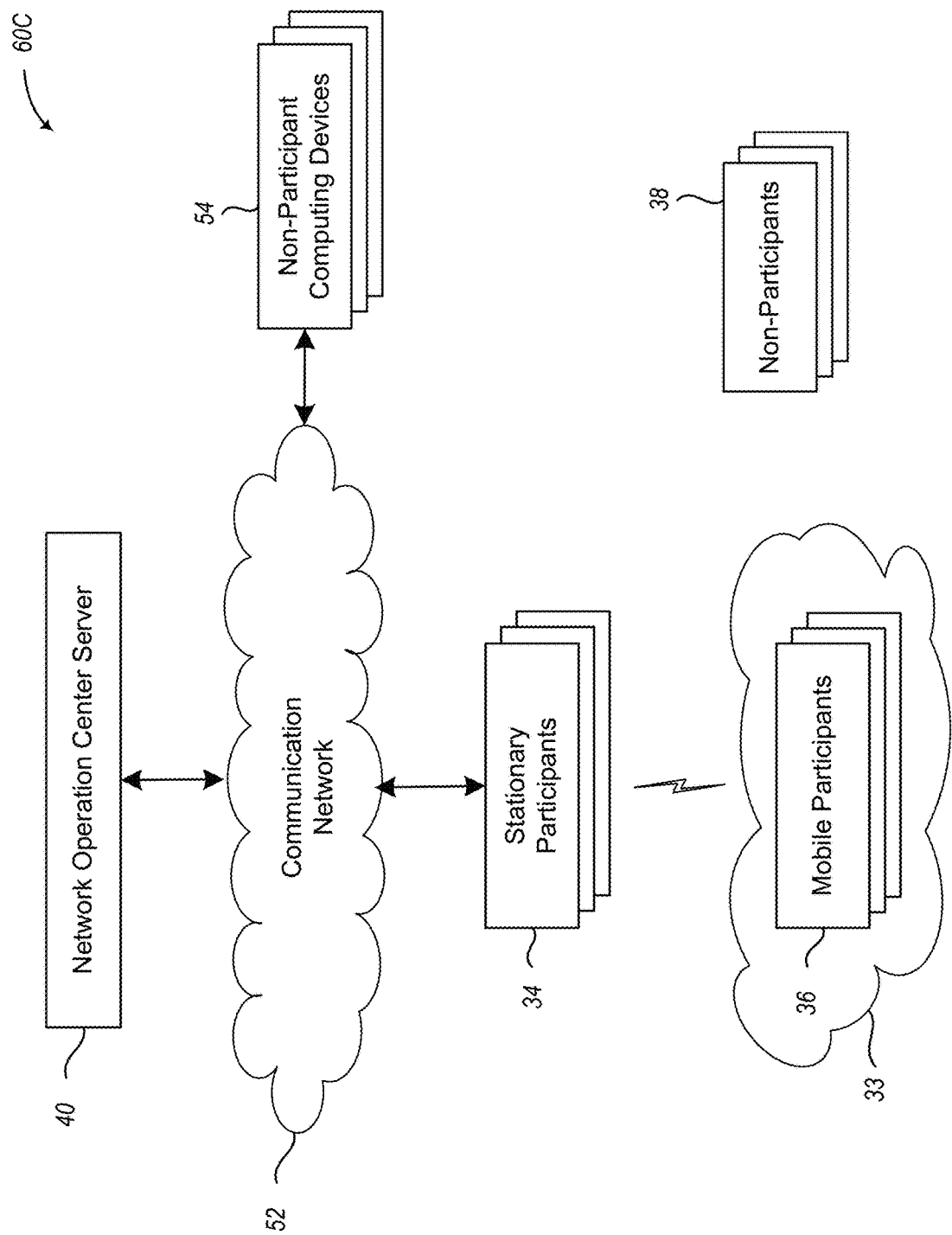

FIGS. 2A-2B illustrate block diagrams of the different layers of the ad hoc mesh network in accordance with embodiments described herein. FIG. 2A illustrates an example 60A of a communications network 33 between a plurality of mobile participants 32*a*-32*c*. Although FIG. 2A only illustrates three mobile participants as creating network 33, embodiments are not so limited and one or a plurality of mobile participants may be employed. Similarly, the network 33 may be established from other types of mobile participants, including various combinations of tier 1 mobile participants, tier 2 mobile participants, or tier 3 mobile participants, which perform many of the same functions as the mobile participants.

Each mobile participant 32*a*-32*c* transmits radio frequency signals to be received by other mobile participants 32 that are within line-of-sight of the sending mobile participant 32. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table described herein). In various embodiments, the notification signals provide individualized information regarding the sending mobile participant 32 so that other mobile participants 32 know that they are within line-of-sight communication of the sending mobile participant 32 within network 33. As mentioned above, these notification signals may be referred to as self-reporting signals, since the mobile participant 32 is independently reporting its position and kinematic information to any other mobile participants 32 that are within line-of-sight of the transmitting mobile participant 32 without being prompted or requested by another mobile (or stationary) participant. The mobile participants 32 utilize the notification signals to generate a participant table that is utilized to transmit data signals between the mobile participants 32.

In various embodiments, the information in the notification signal includes the mobile participant's 32 identification information, geolocation, kinematic information, throughput capabilities, frequency capabilities, and other information. In various embodiments, the notification signals also include transmission time information that allows for Time Distance of Arrival (TDOA) and Time of Flight (TOF) or Round Trip Timing (RTT) calculations.

The geolocation of the mobile participant 32 may be determined via traditional methods like GPS sensors or modules, cell tower or stationary participant signal triangulation, or via notification messages from other devices or participants that know or estimate the position or location of the mobile participant 32. This can be accomplished with extreme accuracy and minimal latency when notification messages are echoed and supported by stationary participants. The geolocation may also be referred to as the position or location of the mobile participant 32.

The kinematic information may be obtained by monitoring the mobile participant's 32 position and identifying changes over time, utilizing various sensors to calculate or determine the kinematic information, or obtaining it from another system.

The frequency capabilities of the mobile participant 32 may be predetermined based on the type of hardware utilized by the mobile participant 32. For example, the hardware of the mobile participant 32 may be designed to utilize ACARS, IEEE 802.11 standards, or some other wireless transmission frequencies or standards, which defines the frequency capabilities of the mobile participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile participant 32 or on the current processing capacity or network traffic of the mobile participant 32 or a number of other factors. For example, if the mobile participant 32 is a Boeing 737-700 then it may have more throughput capabilities than a Boeing 777-200ER because the Boeing 737-700 may have less passengers and thus may be supporting fewer data requests from user device onboard the airplane, which can allow for more possessing power to be directed towards forwarding communications between other participants.

In some embodiments, notification signals are transmitted via directional broadcast beams. In other embodiments, the notification signals may be transmitted using non-directional broadcast signals. In general, the use of the term "broadcast" herein refers to the transmission of a signal by a sending participant without being requested by another participant and does not have a specific participant as a destination. In various embodiments, directional notification signals may be transmitted in a sequential or non-sequential 360-degree pattern, so that the notification signal is transmitting in all directions surrounding the participant.

Use of directional transmissions can reduce the amount of power needed to transmit the notification signal or other communication to another participant. Moreover, the use of directional transmissions enables the sending participant to use just enough power to ensure it gets to its intended target. The participant table described herein enables the participants to calculate the required transmit power for transmission without wasting extra power on an overly powerful transmission. Additionally, directional transmissions can reduce interference between transmissions in a congested space as well as make transmissions more secure.

The notification signal may be broadcast periodically, at predetermined times, dynamically selected based on number and proximity of other mobile participants, or at a given dynamically changing update rate. In some embodiments, the rate at which the mobile participant 32 transmits its notification signal may change based on a combination of the distance, closure velocity, and closing angles between the sending mobile participant 32 and other mobile participants 32 within line-of-sight of the sending mobile participant 32.

As mentioned above, the mobile participants 32a-32c broadcast notification signals to inform other mobile participants 32 of their position and movement. For example, mobile participant 32a broadcasts notification signals with information identifying itself and its respective geolocation and kinematic information without regard to the presence or location of mobile participants 32b or 32c. If mobile participant 32c is within line-of-sight of mobile participant 32a, mobile participant 32c receives the broadcasted notification signals from mobile participant 32a and utilizes the information in the notification signals, and its own location and kinematic information, to identify the position and movement of mobile participant 32a relative to itself.

The mobile participants 32 can utilize the notification signals to track other participants and to create and update the participant table to identify which participants are in network 33, their location, their capabilities, and who they are in line-of-sight communication.

As mentioned above, the notification signals are utilized to generate and maintain a participant table so that the mobile participants 32 can transmit messages or data to one another within network 33. For example, the participant table is utilized to determine a recipient participant. The sending mobile participant 32 then transmits a data signal destined for a target mobile participant 32. The data signals are used to transmit the desired messages or data to other participants, which is described in more detail below in conjunction with FIG. 2B. Briefly, the various communications between the mobile participants 32a-32c creates a communication network 33 among each other that enable them to communicate with one another without the use of another communication backbone, such as a cellular tower network.

Similar to the notification signals, the data signals may be transmitted via directional transmission beams or non-directional transmission signals. In various embodiments, the sending mobile participant 32 utilizes the participant table to determine a location of the recipient participant. The sending mobile participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

The messages or information contained in the data transmissions may have originated by the sending participant or it may have originated by another computing device and is now being forwarded by the sending participant. In some embodiments, the data may originate at one participant and be destined for another participant. In other embodiments, the data may originate at a non-participant computing device (e.g., content servers, web servers, remote networks, etc.) and be destined for a participant. In yet other embodiments, the data may originate at one participant and be destined for a non-participant computing device.

If the sending participant is within line-of-sight to a destination participant, then the originating participant sends the message or data directly to the destination participant. But if the sending participant is not within line-of-sight to the destination computing device, then the sending participant transmits the message or data to another participant who can continue to forward the message or data toward the destination computing device, which may include one or more "hops" between mobile or stationary participants.

In some embodiments, the data signals may be transmitted whenever the participant has data to be sent and has bandwidth or computing power to transmit the data. In other embodiments, the data may be buffered for a period of time until it can be successfully transmitted from the sending participant to another mobile or stationary participant.

In various embodiments, the participants may use one of various different frequencies to transmit data signals to other participants. In some embodiments, participants scan the entire spectrum or spectrums they are physically able, and legally allowed, to transmit within. Each participant determines based on real-time and historical data what frequencies are available and the length of transmission that can be transmitted without interference on each frequency, as well as what transmitters are available on the participant. In some embodiments, the participants may utilize Dynamic Spectrum Access (DSA) to use multiple frequencies for a single transmission to make full use of the available spectrum. Participants can "sniff" the spectrum and identify free space to use and make such information available to other participants via the participant table. For example, if an airplane is in a thunderstorm it can identify and avoid those frequencies that are unusable for use in unstable whether, and it knows what participants are within range and what frequencies they have available to retransmit to a stationary participant, if required. From this information in the participant table, the aircraft can choose the appropriate frequency/frequencies to transmit on to obtain the highest data-rate while maintaining a signal to noise ratio that ensures data packet reception.

In various embodiments, each participant determines a Quality of Service (QOS) and Signal to Noise Ratio (SNR) between it and each other participant in line-of-sight of that participant, as well as available frequencies to the receiving participant. The participant then assesses the data it needs to transfer and chooses the most efficient frequency with a high QOS and SNR on which to transmit. Moreover, participants may utilize additional information to select what frequencies to transmit data. For example, if a participant is in a thunderstorm, it selects frequencies that are more suitable for use in inclement weather.

The participant can cross reference the throughput and frequency abilities of the other participants, via the participant table, to determine the path and frequency on which to send the data. Once that is determined, the participant can route the data and amplify the signal based on the frequency, distance or latency to the chosen participant, and any known interference values it may have.

In some embodiments, each participant utilizes protocols to establish transmit priorities based on the participant's role at any given moment. For example, an aircraft prioritizes safety of flight information first, then ATC communications, navigation, identification, headquarter communication, then Internet/entertainment connectivity. A cell phone, depending on environment, may act in different ways. For example, at home, it may prioritize Wi-Fi frequencies and prioritize voice communications, then text, then Internet, then email. However, when the cell phone is in a car traveling down the road, the cell phone can use its gyrometers and accelerometers to detect that you are in a vehicle and set the priorities for V2X (vehicle to vehicle/Infrastructure/Pedestrians/other transportation) above voice, text and Internet data exchanges. In contrast, if the cell phone is in a bus or train it may not transmit V2X information.

As mentioned above with respect to FIG. 2A, the multi-layered network allows each participant to track other participants that are local or proximal to the participant, while also tracking transmitted data among participants. The multi-layered network also includes a top layer that provides global tracking of participants and non-participants, and data communication with non-participant computing devices, which is illustrated in FIG. 2B.

FIG. 2B illustrates a block diagram of the highest layer of the multi-layered network. Example 60C in FIG. 2B includes mobile participants 36, stationary participants 34, and network operation center server 40.

Mobile participants 36 and stationary participants 34 employ embodiments described herein to transmit notification signals to generate a participant table to track participants, their location, and the communication characteristics between line-of-sight participants. In various embodiments each stationary participant 34 stores a complete copy of the participant table. When a stationary participant 34 receives an update to the participant table from a mobile participant 36, the stationary participant 34 transmits the update to the other stationary participants 34. The stationary participants 34 also transmit, upon receipt of an update or at predetermined times, the total participant table or only a portion thereof to the mobile participants 36 that are in line-of-sight communication of that corresponding stationary participant 34, which can then be forwarded by the mobile participants 36 to other non-line-of-sight mobile participants 36.

In some other embodiments, the stationary participants 34 may maintain or store a portion, but not all, of the total participant table. For example, each stationary participant 34 stores the portion of the participant table for mobile participants 36 that are within a predetermined distance or number of hops away from the corresponding stationary participant 34. In at least one such embodiment, the stationary participants 34 may provide updates to the network operation center server 40 via communication network 52, which can then distribute the update, i.e., only the update, the total participant table, or a portion of the participant table, to other stationary participants 34. In some embodiments, the network operation center server 40 or the stationary participants 34 can add additional information to the participant table, such as the location of non-participants, which may be obtained from FAA reports, weather radar, local tracking by the mobile participants 36 or the stationary participants 34, or other sources.

As discussed herein, mobile participants 36 utilize the participant table to transmit or forward data or data requests to other mobile participants 36 or to non-participant computing devices 54. Accordingly, the mobile participants 36 communicate with stationary participants 34 (either via line-of-sight communications or via one or more other mobile participants 36) to send and receive data to and from the non-participant computing devices 54 via communication network 52.

The communication network 52 may be any wired or wireless communication network that facilitates the transmission of information from stationary participants 34 to network operation center server 40. In some embodiments, communication network 52 may be the Internet.

In various embodiments, the mobile participants 36 may also provide additional information to the stationary participants 34 and to the network operation center server 40. For example, in some embodiments, the mobile participants 36 may utilize echo signals from the notification signals to track non-participant objects 38, which is described in more detail in U.S. patent application Ser. No. 15/892,259, filed Feb. 8, 2018, entitled "Object Tracking Using A Cognitive Heterogeneous Ad Hoc Mesh Network."

FIG. 3 illustrates an example participant table 120 that tracks participants in the cognitive heterogeneous ad hoc mesh network in accordance with embodiments described herein. Participant table 120 includes individual participant information 122 and line-of-sight participant information 124.

The individual participant information 122 separately identifies multiple participants 126a-126b. For each participant 126, the individual participant information 122 includes an identifier 128 for the corresponding participant 126, and kinematic information 130 of the corresponding participant 126 which can include location information of the corresponding participant 126. Spectrum capabilities 131 of the corresponding participant 126 describe the available media types associated with this node. Also included is a timestamp 132 indicating the time at which the information for the corresponding participant 126 was determined or updated, and a routing score 133 determined by the participant computing this table 120 for the peer participant 126. The individual participant information 122 may also include other information, not shown, such as radio or processing capabilities of the corresponding participant, security protocols or encryption information, system limitations, or other information.

The line-of-sight participant information 124 lists those participants that are within line-of-sight communication of participants 126a-126b, which establishes each participant pair in the participant table 120. For example, corresponding line-of-sight participants 148a-148b are in line of sight of participant 126a.

The line-of-sight participant information 124 includes an identifier 134 for each corresponding line-of-sight participant 148a-148d, a quality of signal 136 for the notification signal sent by the corresponding line-of-sight participant 148 that was received by the corresponding participant 126a-126b, frequency capability 138 and spectrum 140 capabilities of each corresponding line-of-sight participant 148, and a routing score 141 as determined by the other line-of-sight participant.

In some embodiments, the line-of-sight participant information 124 also includes the weighted value 144 between each corresponding participant pair. The weighted value 144 is the individual score for that corresponding participant pair, which is based on a weighted combination of the latency in transmissions between the pair participants, movement of the participants relative to one another (e.g., based on the difference between the kinematic information 130 of each participant in the pair), quality of signal 136 between the pair participants, frequency 138 and spectrum 140 capabilities between the pair participants (e.g., based on the spectrum capabilities 131), whether the timestamp 132 is beyond some threshold amount of time in the past, other information, or any combination thereof. Distance may be a factor of latency because a total latency of a transmission is based on a processing time to transmit a communication, a flight time of the transmission (based on the distance between the participants and the speed at which radio waves propagate through the air), and a processing time to receive the communication. As described herein, participants may also include a routing score. The weighted value 144 between individual participant 126 and its line-of-sight peer is taken into account the routing score of one or both participants. Moreover, the weighted value 144 may be modified, such as increased, if one of the participants is a routing participant.

Each of these types of information may be provided an initial score (e.g., if two airplanes are within 200 meters of each other then it may have a better, lower score than two airplanes 2 kilometers apart), which may be based on one or more thresholds or may be actual values. Each type of information is then weighted based on various factors that can impact the communication between the participant pairs. For example, in some situations, quality of signal may be more important and weighted higher than latency, but kinematic information may be more important and weighted higher than quality of signal (e.g., due to the potential data loss issues from Doppler effect or the potential to be out of line-of-sight). Thus, each type of information may be weighted based on its importance relative to the other types of information such that more important information has a higher weight than lower important information.

In at least one embodiment, the individual score between a participant pair may be based on system limitations of one or both of the participants in the participant pair. For example, participant antennas can generally account for some amount of Doppler shift/effects. However, if the participants of a participant pair are traveling towards one another at a high enough rate of speed, then the antennas may not be able to account for the Doppler shift/effects, which may result in a reduction of quality of service, throughput, or dropped information. Such system limitations may impact the individual score, which can result in calculating a route to avoid participant pairs that currently have or may have system limitations. In at least one such embodiment, one or more thresholds may be employed such that as the Doppler shift/effect becomes worse, the individual score also gets worse (e.g., increases).

In some embodiments, system limitations may be included in the participant table or may be deduced from information within the participant table. In other embodiments, some of these system limitations may not be included in the participant table or may change based on movement of the participants, which can result in increased latency or re-routing the communication.

In various embodiments, each corresponding participant 126 updates its locally stored version of the participant table 120. Stationary participants can update the participant table 120 maintained by the stationary participants based on the information contained in the notification signal sent by the participants 126.

While FIG. 3 shows a table whose contents and organization are designed to make it more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

The operation of certain aspects will now be described with respect to FIG. 4. In at least one of various embodiments, process 150 described in conjunction with FIG. 4 may be implemented by or executed on one or more computing devices, such as mobile participants 36. The process described in conjunction with FIG. 6 may be implemented by or executed on one or more computing devices, such as mobile participants 36 or stationary participants 34.

Figure 4:
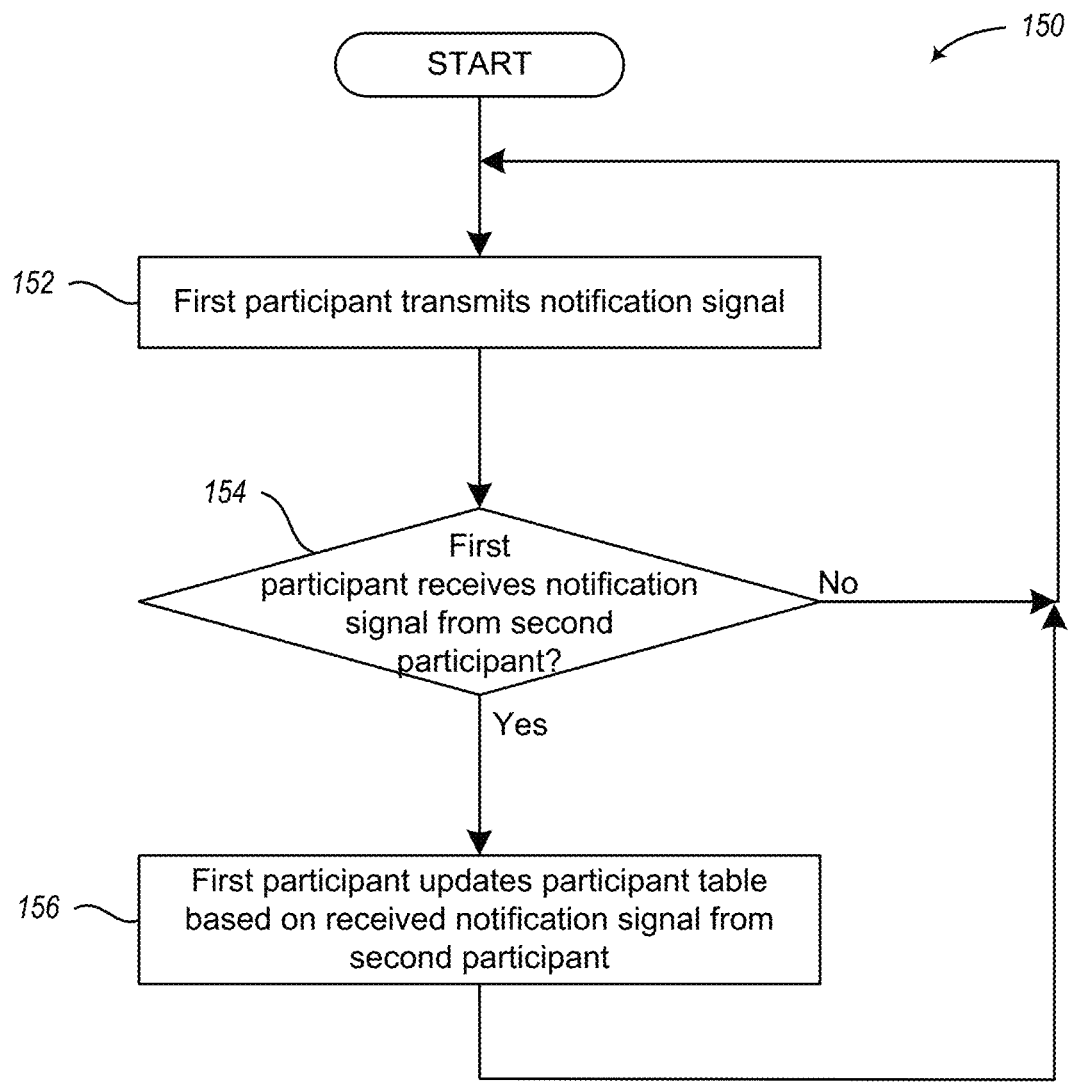
FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

Process 150 begins at act 152, where a first mobile participant transmits a notification signal. In various embodiments, the first participant transmits the notification signal at a predetermined rate, periodically, at predetermined times, or based on various operating characteristics of the first participant. The rate at which notification signals are transmitted may be static or dynamic and may change based on the distance and rate of closure between other participants or the number of other participants within line-of-sight of the first participant.

Process 150 proceeds to decision act 154, where the first participant receives a notification signal from a second participant. In various embodiments, the first participant may process each notification signal sent by the second participant and received by the first participant. In other embodiments, the first participant may process a subset of the notification signals received from the second participant. If the first participant has received a notification signal from the second participant and the first participant is to process the notification signal, then process 150 flows to act 156; otherwise process 150 returns to act 152 to continue sending its notification signals and waiting for notification signal from other participants.

At act 156, the first participant updates its local version of the participant table based on the information in the received notification signal from the second participant. If the second participant is not in the participant table as being within line-of-sight communication of the first participant, the first participant adds the second participant to the participant table indicating that the first and second participants are within line-of-sight communication of one another, as a participant pair. If the second participant is already listed in the participant table, the first participant updates the participant table with the information from the received notification signal, such as the current location and kinematic information from the second participant. In some embodiments, the first participant updates the participant table to include additional information regarding the communication with the second participant, such as the quality of signal received from the second participant, signal to noise ratio, frequency or spectrum capabilities, etc. After act 156, the first participant continues in act 152.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 5:
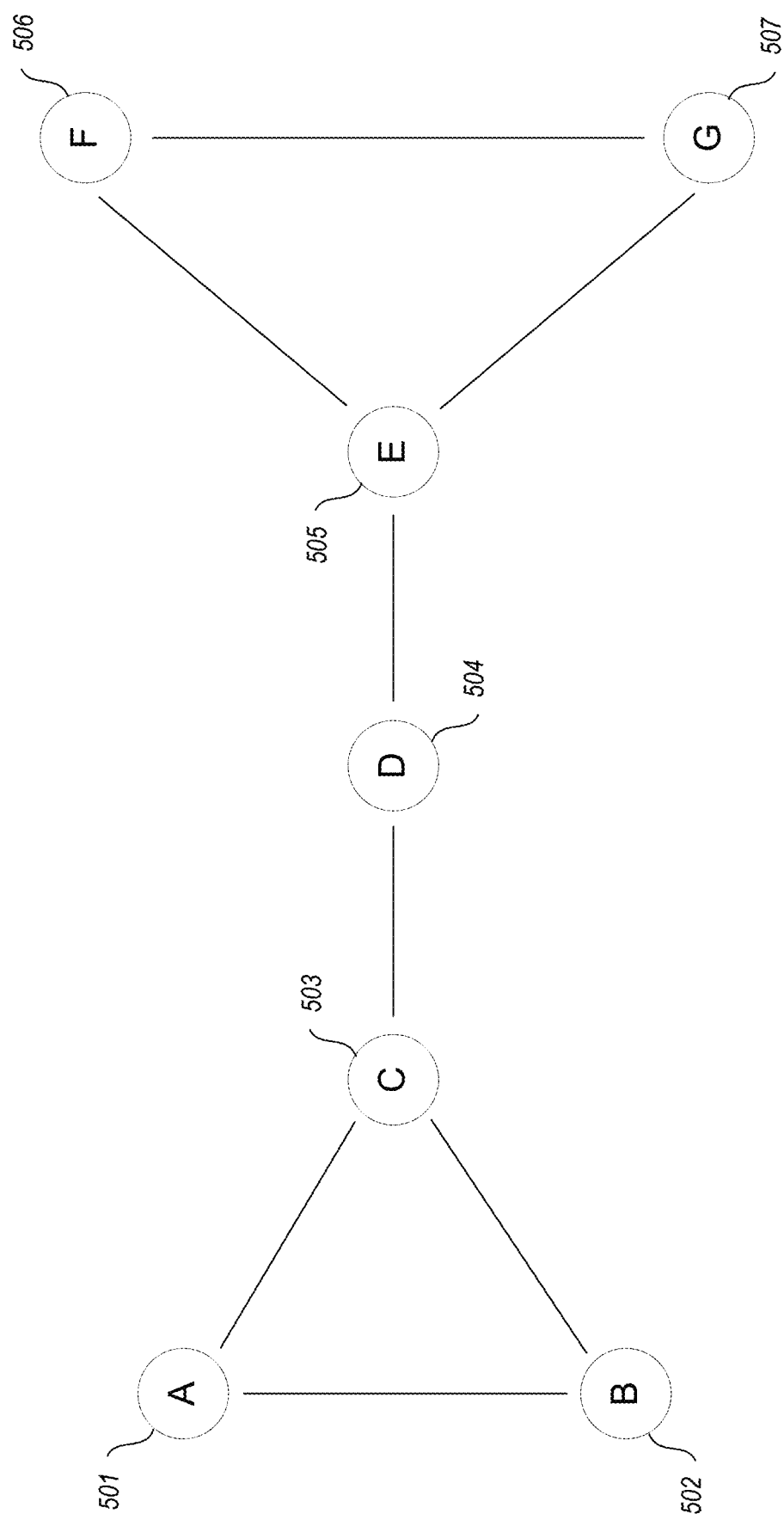
FIG. 5 is a network diagram showing an initial configuration of an ad hoc network operated by the facility.

FIG. 5 is a network diagram showing an initial configuration of an ad hoc network operated by the facility. Participant A 501 is in direct contact with participant B 502 and participant C 503. Participant B 502 is in direct contact with participant A 501 and participant C 503. Participant C 503 is in direct contact with participant A 501, participant B 502, and participant D 504. Participant D 504 is in direct contact with participant C 503 and participant E 505. Participant E 505 is in direct contact with participant D 504, participant F 506 and participant G 507. Participant F 506 is in direct contact with participant E 505 and participant G 507. Participant G 507 is in direct contact with participant E 505 and participant F 506. This example configuration of the ad hoc network operated by the facility may be caused by the location of the participants 501-507, movement of the participants 501-507, capabilities of the participants 501-507, other transmission criteria, or some combination thereof.

Figure 6:
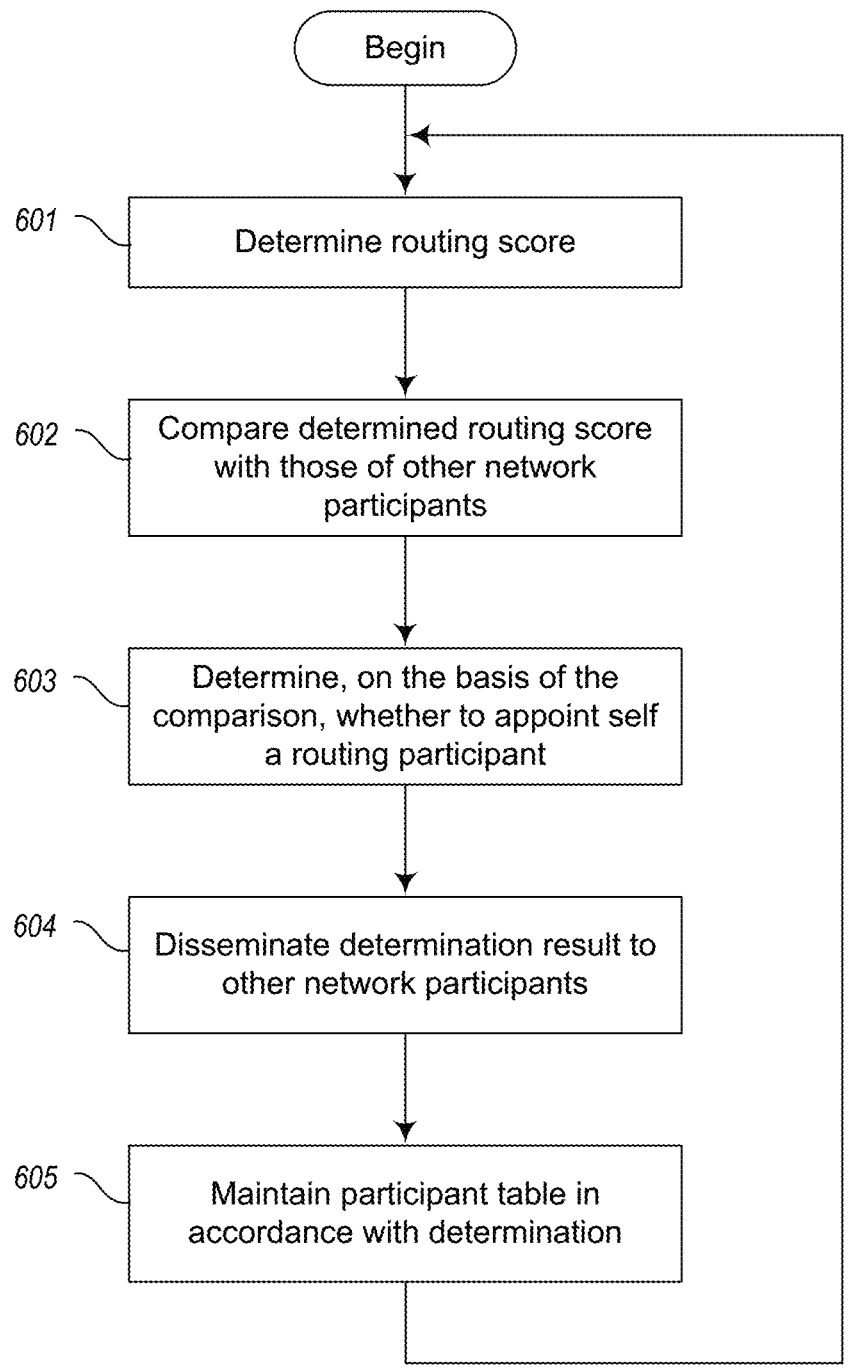
FIG. 6 is a flow diagram showing a process performed by the facility in some embodiments to maintain a set of one or more routing participants for the network.

FIG. 6 is a flow diagram showing a process performed by the facility in some embodiments to maintain a set of one or more routing participants for the network. In some embodiments, the facility performs this process in each of the network participants, such as periodically or continuously. In act 601, the facility determines a routing score for the participant. As noted above, in various embodiments, the facility determines a participant's routing score based upon various sets of determinants, which can include the number of other participants to which the participant is directly connected, the number of these that are routing participants, the participant's radio power level, the participant's CPU capability and utilization level, the amount of available transient or persistent storage space in the participant, the participant's battery size and status, the number of line-of-sight connections from the participant to a connection to the Internet, signal-to-noise ratio, data collision rate, RF interference level, duty cycle, and received signal strength indication. One example of a basis used by participants to determine their own routing scores in some embodiments is discussed below in connection with Tables 1-6.

In act 602, the facility compares the routing score determined in act 601 with those that other network participants have determined for themselves. In some embodiments, these routing scores of other network participants are retrieved from the participant's participant table, where they were stored after being received from the scored participant or an intermediary participant. In act 603, the facility determines, on the basis of the comparison in act 602, whether to appoint itself a routing participant. In various embodiments, the facility uses different standards for the determination for act 603, such as an absolute score threshold; a score threshold that is relative to the other routing scores in the network; the number of participants in the network; the present number of line-of-sight connections between participants in the network and present routing participants; etc. In act 604, the facility disseminates the result of the determination in act 603 to the other network participants, such as in a broadcast message or as part of a notification signal. In some embodiments, in act 604, the facility also reports the results of the determination to computer systems outside the network, as well as in some cases, other information about the participant's state as a routing participant. In act 605, the facility maintains the participant table on this participant in accordance with the determination of act 603. In various embodiments, this involves expanding the number of network participants in the participant table if the participant determines to appoint itself a routing participant, or reducing the number of participants in the participant table if the participant determines to revoke its own routing participant status. In some embodiments, this updated participant table, or a portion thereof, is transmitted to other participants as part of its notification signal, which informs those participants that it is now a routing participant. After act 605, the facility continues in act 601 to repeat this cycle. In some embodiments, the facility repeats the cycle periodically, such as a frequency of 15 seconds, 30 seconds, 45 seconds, one minute, two minutes, five minutes, 10 minutes, 15 minutes, 30 minutes, one hour, two hours, four hours, six hours, etc. In some embodiments, the facility may repeat this cycle in response to other participant or network criteria, such as if network topology significantly changes, another routing participant becomes unresponsive, or the participant itself has reduced capabilities.

An example of the performance of the process shown in FIG. 6 that relates to the sample network shown in FIG. 5 is provided below in connection with Tables 1-4. In this example, the facility uses the following formula to determine a routing score, although other formulas may also be used:

(number of connected participants)+5×(number of connected routing participants)

Table 1 below shows the facility's determined routing score and routing participant status for each of participants A-G 501-507 shown in FIG. 5 at a first time.

TABLE 1

| participant | number of connected participants | number of connected routing participants | routing score | routing participant |
|---|---|---|---|---|
| A | 2 | 0 | 2 | |
| B | 2 | 0 | 2 | |
| C | 3 | 0 | 3 | yes |
| D | 2 | 0 | 2 | |
| E | 3 | 0 | 3 | yes |
| F | 2 | 0 | 2 | |
| G | 2 | 0 | 2 | |

For each participant, Table 1 shows: the number of other participants to which this participant is connected; the number of these that are presently routing participants; this participant's routing score; and an indication of whether this participant has appointed itself a routing participant on the basis of its routing score. Before this first time, none of the participants in the network has appointed itself a routing participant, so none of participants A-G is shown as being connected to any routing participant. As a result, based upon the formula above, the facility determines the shown participant routing scores solely on the basis of number of other participants to which that participant is connected. Because participants C and E each have the maximum routing score of 3, these two participants appoint themselves as routing participants.

Because the formula employed in this example relies upon which of the network's participants are routing participants, determinations of routing participants can undergo periods of transience before settling to a stable configuration. In particular, when determining the routing scores, a participant may pass through various transient states that do not holistically reflect the overall network, but instead reflect the in-progress processing. This is normal and expected, because the transient states also reflect a possible incomplete network topology. Each identified network state is a net improvement in the routing solution, and is thus viable. As additional information becomes available, the routing status is continuously updated to achieve the state shown in Table 2.

Table 2 below shows the facility's determination of routing score and routing participant status for participants A-G at a second time.

TABLE 2

| participant | number of connected participants | number of connected routing participants | routing score | routing participant |
|---|---|---|---|---|
| A | 2 | 1 | 7 | |
| B | 2 | 1 | 7 | |
| C | 3 | 1 | 3 | yes |
| D | 2 | 2 | 12 | promote |
| E | 3 | 1 | 3 | yes |
| F | 2 | 1 | 7 | |
| G | 2 | 1 | 7 | |

Based on the relatively high score of participant D, the facility promotes participant D to routing participant. As a result, the routing scores of participants C and E increase, as shown below in Table 3.

TABLE 3

| participant | number of connected participants | number of connected routing participants | routing score | routing participant |
|---|---|---|---|---|
| A | 2 | 1 | 7 | |
| B | 2 | 1 | 7 | |
| C | 3 | 1 | 8 | yes |
| D | 2 | 2 | 12 | yes |
| E | 3 | 1 | 8 | yes |
| F | 2 | 1 | 7 | |
| G | 2 | 1 | 7 | |

Figure 7:
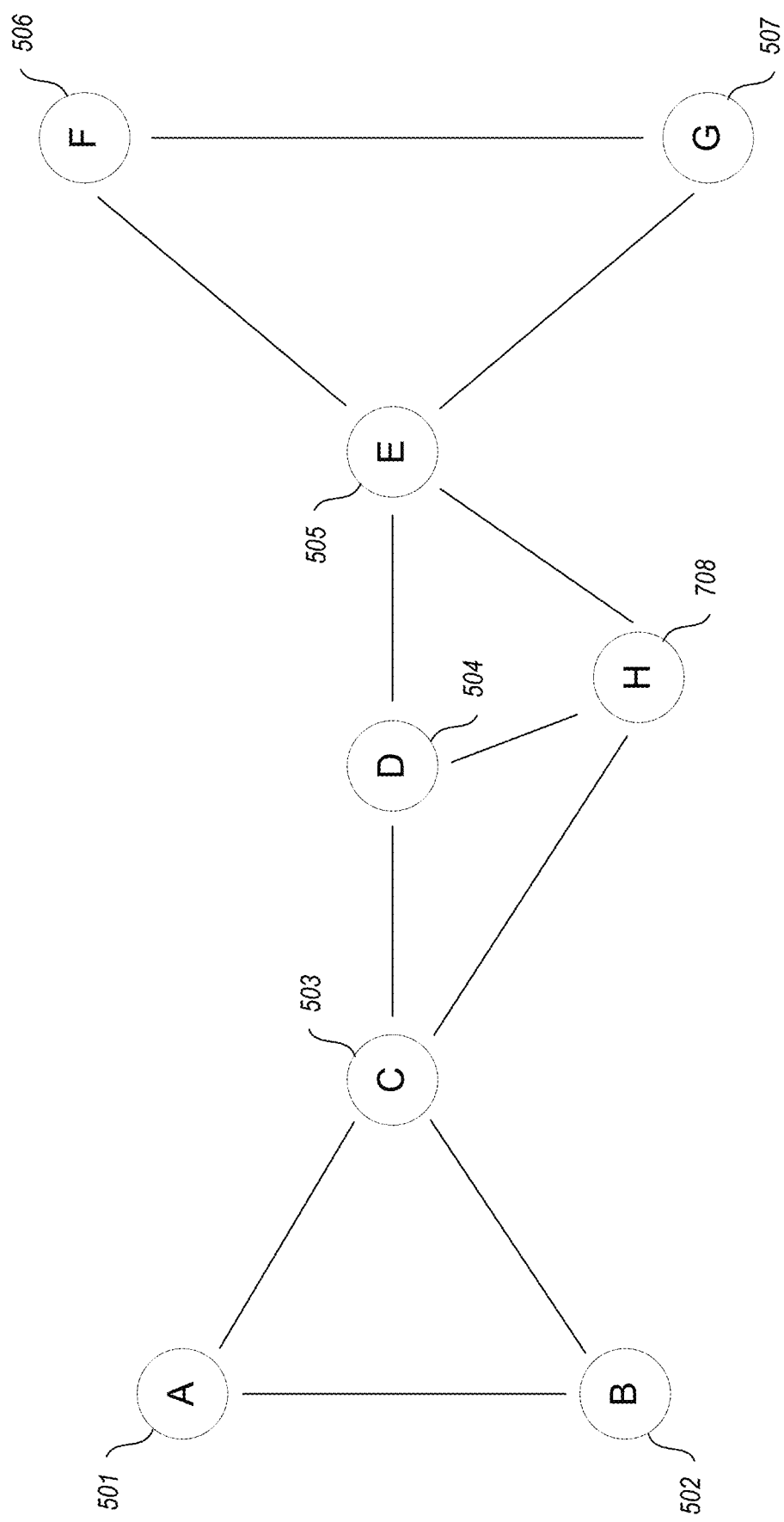
FIG. 7 is a network diagram showing the arrival of a new participant in the sample network shown in FIG. 5, in accordance with the dynamic nature of the ad hoc networks supported by the facility.

FIG. 7 is a network diagram showing the arrival of a new participant in the sample network shown in FIG. 5, in accordance with the dynamic nature of the ad hoc networks supported by the facility. In particular, new participant H 708 has arrived in the network. Participant H 708 is able to make line-of-sight connections with participant C 503, participant D 504, and participant E 505.

The example discussed above is continued below to show the facility's response to the arrival of new participant H 508. Table 4 below shows the facility's determination of routing score and routing participant for participants A-H at a fifth time, after participant H has arrived in the network. At the time that participant H arrives in the network, it is not a routing participant.

TABLE 3

| participant | number of connected participants | number of connected routing participants | routing score | routing participant |
|---|---|---|---|---|
| A | 2 | 1 | 7 | |
| B | 2 | 1 | 7 | |
| C | 4 | 1 | 9 | yes |
| D | 3 | 2 | 13 | yes |
| E | 4 | 1 | 9 | yes |
| F | 2 | 1 | 7 | |
| G | 2 | 1 | 7 | |
| H | 3 | 3 | 18 | promote |

It can be seen that, relative to Table 2, an eighth row has been added to Table 4 for participant H. The number of connected participants column reflects that participant H is directly connected to three participants, participants C, D, and E, each of which is a routing participant. The routing scores of participants C, D, and E are each updated to reflect the connection each of these participants to new participant H, which is not a routing participant at the time of its arrival. Based upon the routing scores shown in Table 4, the facility additionally appoints participant H as a routing participant.

Table 5 below shows the facility's update of routing scores for participants A-H to reflect the appointment of participant H as a routing participant.

TABLE 5

| participant | number of connected participants | number of connected routing participants | routing score | routing participant |
|---|---|---|---|---|
| A | 2 | 1 | 7 | |
| B | 2 | 1 | 7 | |
| C | 4 | 2 | 14 | yes |
| D | 3 | 3 | 18 | yes |
| E | 4 | 2 | 14 | yes |
| F | 2 | 1 | 7 | |
| G | 2 | 1 | 7 | |
| H | 3 | 3 | 18 | yes |

While the addition of participant H as a routing participant has changed the number of connected routing participants for participants C, D, and E, and consequently changed their score, the list of appointed routing participants does not change as a result. For this reason, the configuration shown in Table 5 is stable, and will continue until more participants enter or leave the network, existing participants lose or gain connections with other participants, or other events occur as described below.

As noted above, in some embodiments, in each participant, the facility considers other factors in determining that participant's routing score, including some that can vary even when no participant enters or leaves the network. For example, a participant's CPU utilization level can change over time, as can the amount of available transient or persistent storage space, battery status, and displacement from wired connections to the Internet. In embodiments where these or other variable factors for determining routing score are used by the facility in determining routing score, routing score and therefore routing participant status can change even where no participants enter or leave the network, or change the set of other participants they can directly connect to. Accordingly, a participant can choose to lower its routing score or unappoint itself as a routing participant in response to changes in these other factors. Likewise, a participant can choose to increase its routing score appoint itself as a routing participant in response to changes in these other factors.

Figure 8:
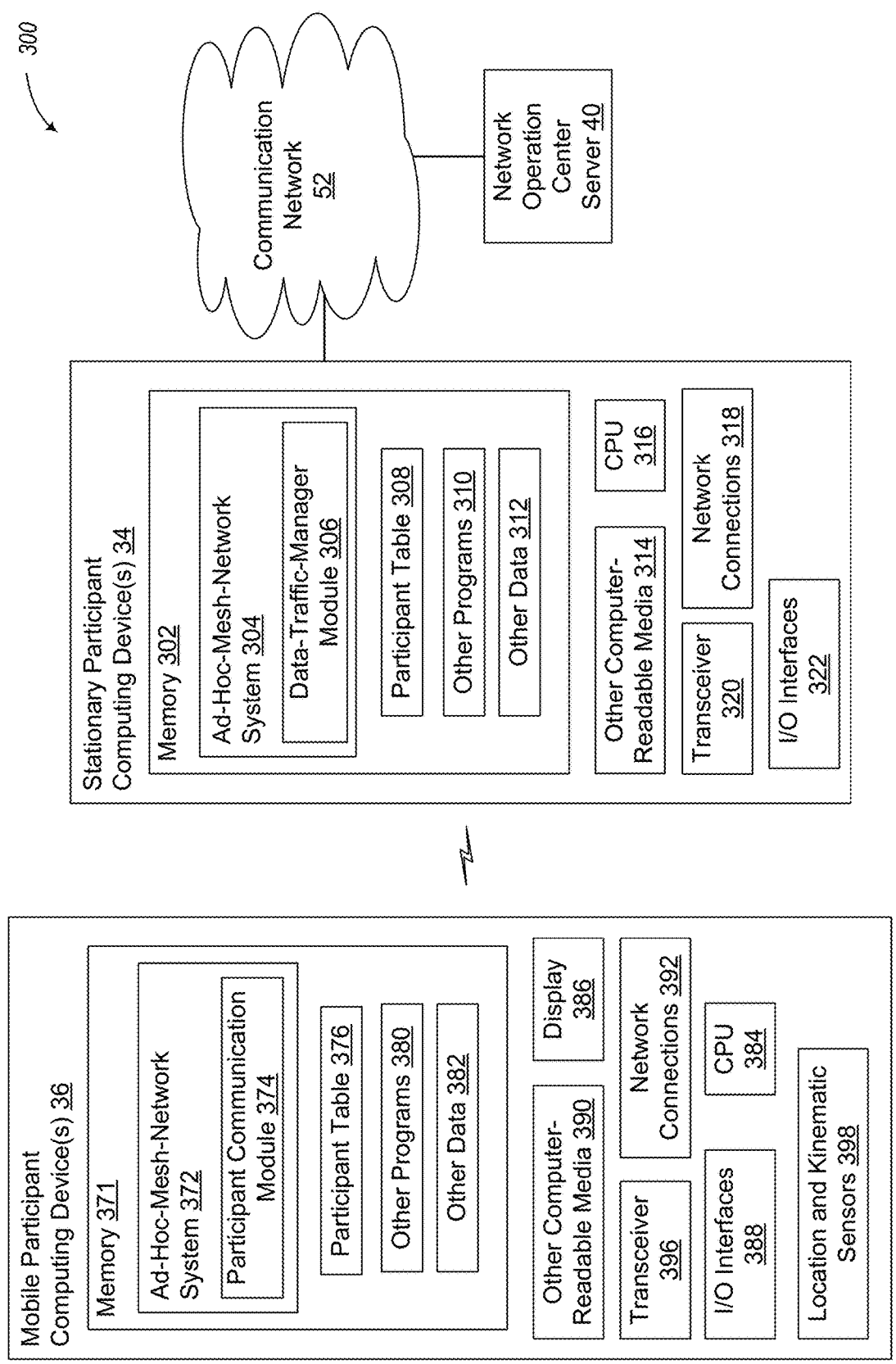
FIG. 8 shows a system diagram that describes one implementation of computing systems for implementing embodiments described herein.

FIG. 8 shows a system diagram that describes one implementation of computing systems for implementing embodiments described herein. System 300 includes mobile participant computing device(s) 36, stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 34 may include memory 371, one or more central processing units (CPUs) 384, display 386, I/O interfaces 388, other computer-readable media 390, network connections 392, transceiver 396, and motion sensors or other sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes participant communication module 374. The participant communication module 374 may employ embodiments described herein to send notification signals, track participants via participant table 376, and to generate and transfer data and communications to other participants.

The memory 371 also stores participant table 376. In various embodiments, this is a local version of the participant table generated by the mobile participant or received from a stationary participant 34 or other mobile participant 36. The participant table 376 may be a partial version or a complete version of the participant table 308 maintained by the stationary participants 34 or by mobile participants if stationary participants are unavailable.

The memory 371 may also store other programs 380 and other data 382. The other programs 380 may include user applications, other tracking or geo-positioning programs, etc. The other data 382 may include data or information regarding one or more non-participant objects or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be a omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of own self-reported notifications, GPS modules, accelerometers, gyroscopes, or other sensors that can be used to determine the position and kinematic information of the mobile participant computing device 36.

Other I/O interfaces 388 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306. The data-traffic-manager module 306 may employ embodiments described herein to transfer data from one participant to another participant and to manage and provide participant table updates. In various embodiments, data-traffic-manager module 306 may communicate with network operation center server 40 via communication network 52, such as to provide or receive participant table updates.

The memory 302 may also store participant table 308, other programs 310, and other data 312. The participant table 308 may be a full version of the participant table 308 or it may be a partial version based on those mobile participants 36 within line-of-sight of or a threshold number of hops from the stationary participant 34. The other data 312 may include data or information regarding one or more tracked objects or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 314 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the positioning and movement of non-participant objects that are reported to it by the mobile participant computing devices 36 or the stationary participant computing devices 34. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

Figure 9:
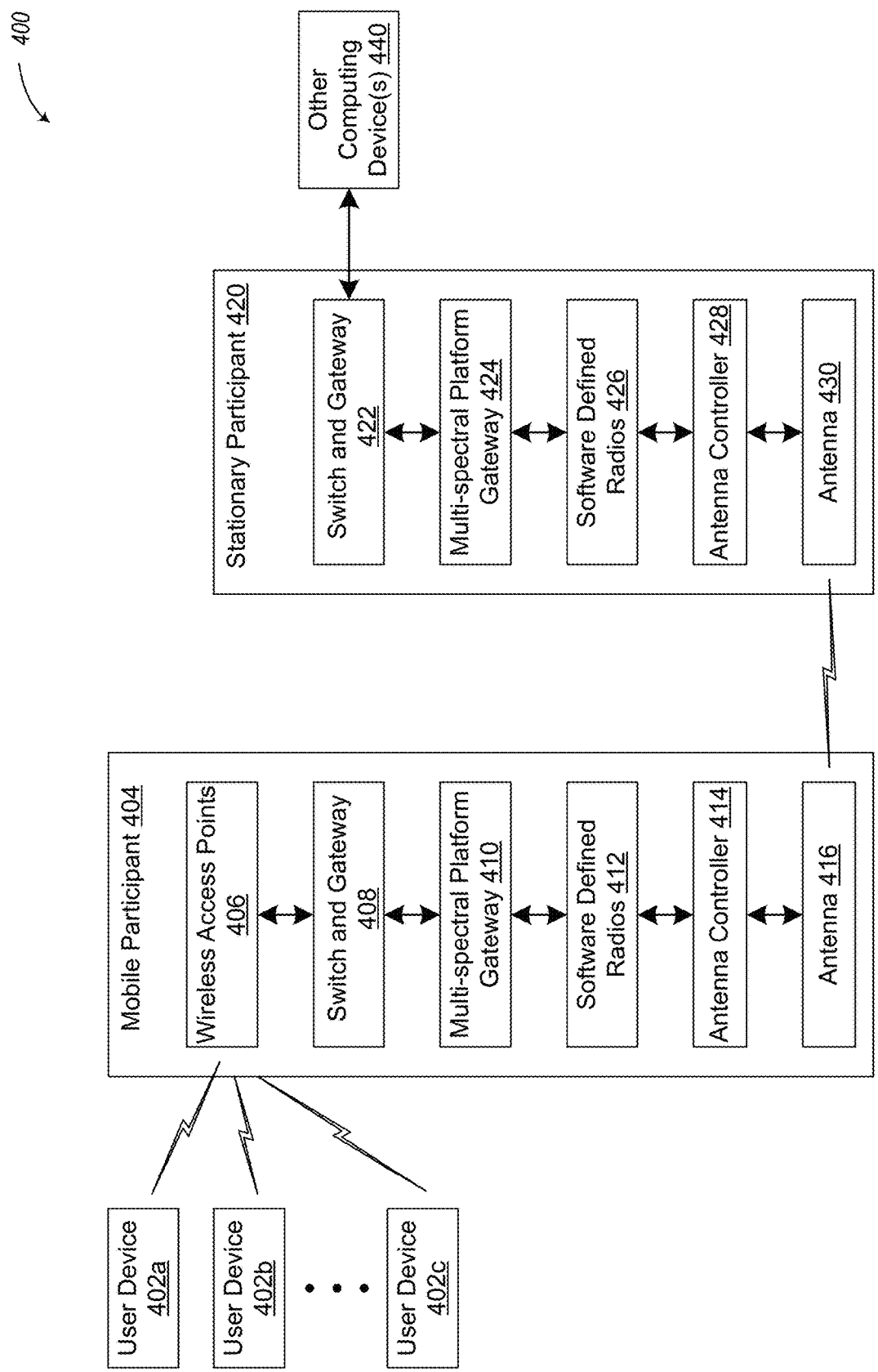
FIG. 9 shows a system diagram that describes another implementation of computing systems for implementing embodiments described herein.

FIG. 9 shows a system diagram that describes another implementation of computing systems for implementing embodiments described herein. System 400 includes user devices 402a-402c that are in wireless line-of-sight communication with mobile participant 404, which is in wireless line-of-sight communication with stationary participant 420, which is in wired communication with other computing device 440. As described above, user devices 402a-402c may be tier 1 mobile participants in communication with a tier 3 mobile participant or some other mobile participant. Mobile participant 404 may be an embodiment of a mobile participant 32 and stationary participant 420 may be an embodiment of a stationary participant 34 discussed above.

Mobile participant 404 includes one or more wireless access points 406 to communicate with user devices 402a-402c. Switch and gateway 408 coordinates and handles communications between the wireless access points 406 and a multi-spectral platform gateway 410. The multi-spectral platform gateway 410 performs embodiments described herein to update the participant table and to select an optimum route, spectrum and antenna to transmit communications from the mobile participant 404. The multi-spectral platform gateway 410 also selects many transmission characteristics based on information in the participant table and provides them to one or more software defined radios 412. The software defined radios 412 select the frequency from the multi-spectral platform gateway selected spectrum at which to transmit communication from the mobile participant 404. The antenna controller 414 form and steer a transmission beam via antenna 416 based on the selected transmission information, the selected frequency, and the multi-spectral platform gateway provided location of intended recipient. This transmission may be directed to another mobile participant 404, another type of mobile participant, or to the stationary participant 420.

In some embodiments, the mobile participant 404 may store or cache a threshold amount of data received from or provided to the user devices 402a-402c. The data may be cached for a threshold amount of time or storage space. In this way, if a user device subsequently requests the same data that was already obtained for another user device, such as a movie or other in-flight entertainment, then the mobile participant 404 can provide the cached data to the user device without having to transmit additional communications to other participants to obtain the data. In some embodiments, forwarding participants may also cache data for a predetermined amount of time, which can act as a backup incase the forwarded communication was not successfully received or if the forwarding participant has to select another route to transmit the communication. In yet other embodiments, the cached data can be used to answer a request from another participant so that they do not have to request the information from a stationary participant, which can alleviate wasted network usage by transferring data that has already been transferred from the internet or other source previously.

Stationary participant 420 receives the transmission from the mobile participant 404 at an antenna controller 428 via antenna 430 and provides the received signals to a software defined radio 426. The software defined radio 426 provides the received communications to a multi-spectral platform gateway 424, which determines whether the communication should be transmitted to a next participant, such as another mobile participant 404, some other mobile participant, or to another stationary participant 420 via a wired network, or whether the communication is to be provided to other computing devices 440. If the communication is to be transmitted to another mobile participant or another mobile participant via line-of-sight communications, then the stationary participant 420 utilizes the multi-spectral platform gateway 424, the software defined radios 426, the antenna controller 428, and the antenna 420 in a manner similar to mobile participant 404 to directionally transmit the communication to a next participant. If the communication is destined for some other non-participant computing device, then the multi-spectral platform gateway 424 provides the communication to switch and gateway 422 for transmission via a wired communication network to other computing devices 440.

If the communication was for data or information from the other computing devices 440, then the other computing devices 440 may answer a request and return data or information to the stationary participant 420 for transmission to the mobile participant 404 and then to the requesting user device 402 in a somewhat reverse fashion than what is described above.

One non-limiting non-exhaustive example of components utilized by the mobile participant 404 may include, but is not limited to: a conformal and non-conformal electronically steered antenna array, cabling appropriate for array and radio communication, cognitive radio suites that both receive and transmit in pairs suitable to service the entirety of the participant max capacity, cabling appropriate for radio to host platform communication, cabling from host platform to server and in-flight entertainment suite, onboard server with up to 10 TB of storage, onboard cognitive modems and routers with public address capability, cognitive equipment power supplies, cognitive radio transmission amplifier and power supply, and onboard firewall.

One non-limiting non-exhaustive example of components utilized by the mobile participant 404 may include, but is not limited to: an adaptive power backup generator, cognitive multi-spectral antennas×6, 42U rack, rack mounted server, integrated processor chip, SSL & VPN appliance, external firewall appliance, internal firewall appliance, load management appliance, web filter appliance, multi-spectral cognitive Radio×4, High throughput router, smart power strip/UPS, mesh network Wi-Fi appliances, small mesh network home appliances, wireless access points with public address appliances, and backhaul connectivity.

In various embodiments, communications between participants may include one or multi-level security. For example, in some embodiments, all transmission via the participant network may employ a first encryption or security mechanism. Some communications between participants may further include another layer of security. For example, a user may have a cell phone and a home network. The cell phone may be a mobile participant and a router on the home network may be a participant access node. The home network may be protected by Wired Equivalent Privacy (WEP), Wi-Fi Protected Access (WPA), Wi-FI Protected Access II (WPA2), or other security mechanism. In this example, the cell phone participant may first encrypt communications via the same security mechanism as the home network and then encrypt the communications using the network encryption. The cell phone participant employs embodiments described herein to route the encrypted communications to the router participant, which can decrypt the communication using the network encryption mechanism and then the home network security mechanism. Even additional layers of encryption and security can be employed for a group of users or devices, subsets of users in the group, individuals in those subsets, etc.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network" and Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR)," are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system for operating participants in an ad hoc mesh network having a plurality of participants each having an identifier, the method comprising:
   in each of the participants:
      transmitting a message of a first type that encodes:
         the participant's identifier,
         a score most recently determined by the participant assessing the participant's suitability for operating as a routing participant in the ad hoc mesh network, and
         an indication of whether the participant has determined to appoint itself a routing participant in the ad hoc mesh network on the basis of the encoded score;
      receiving first messages of the first type transmitted by other participants of the ad hoc mesh network other than the participant, wherein the first messages encodes the identifier of the other participant, and the indication of whether the other participant has appointed itself a routing participant; and
      determining a first value equal to a number of unique participant identifiers encoded by the first messages received during a first period of time;
      determining a second value equal to a number of unique participant identifiers encoded by the first messages received during the first period of time that also encode the indication;
      determining the score assessing the participant's suitability for operating as a routing participant in the ad hoc mesh network, based at least on the first value and the second value; and
      determining whether to appoint itself a routing participant in the ad hoc mesh network based upon comparing the score most recently determined to the scores encoded in the received messages of the first type.

2. The method of claim 1 wherein, in each of the participants, determination of the score is further based on:
   one or more different factors that relate to the participant; and
   one or more different factors that relate to connections between the participant and other participants.

3. The method of claim 1 wherein, in each of the participants, determination of the score is further based on any combination of factors among but not limited to:
   a power level of a radio incorporated into the participant;
   a capability level of a processor incorporated into the participant;
   a utilization level of the processor incorporated into participant;
   an amount of transient storage space available in the participant;

an amount of persistent storage space available in the participant;

an energy storage capacity of a battery incorporated into the participant;

a charge level of the battery incorporated into the participant;

a utilization level of some or all of connections between the participant and other participants;

a signal-to-noise ratio of some or all of connections between the participant and other participants;

a duty cycle of some or all of connections between the participant and other participants;

a data collision rate of some or all of connections between the participant and other participants;

participants;

an RF interference level of some or all of connections between the participant and other participants;

a received signal strength indication of some or all of connections between the participant and other participants; and a minimum number of hops via which the participant is able to connect to the wired Internet.

4. The method of claim 1, the method further comprising:

in a first participant among the plurality of participants in the ad hoc mesh network, in response to determining to appoint itself a routing participant in the ad hoc mesh network, performing one or more routing functions in the ad hoc mesh network.

5. The method of claim 1 wherein a participant table containing information about each of a proper subset of the participants in the ad hoc mesh network is stored by a first participant among the plurality of participants in the ad hoc mesh network, the method further comprising:

in the first participant, in response to determining to appoint itself a routing participant in the ad hoc mesh network, expanding the subset of participants in the ad hoc mesh network about which the participant table stored by the first participant contains information.

6. The method of claim 1, the method further comprising:

in response to the stored indication that the participant is a routing participant in the ad hoc mesh network, transmitting information about the ad hoc mesh network to a server outside the ad hoc mesh network.

7. One or more instances of computer-readable media having contents configured to cause a first participant computing system to perform a method for operating as a node in a mesh network having other participant computing systems, the method comprising:

directly receiving first signals each encoding an identifier of one of the other participant computing systems, at least a portion of the received first signals also encoding an indication that the participant computing system having the contained identifier has appointed itself a routing participant;

determining a first value equal to a number of unique participant computing system identifiers encoded by first signals directly received during a first period of time;

determining a second value equal to a number of unique participant computing system identifiers encoded by first signals directly received during the first period of time that also encode the indication; and determining a routing score for the first participant computing system based at least upon the first value and the second value, the determined routing score reflecting the first participant computing system's suitability as a routing participant computing system in the peer network.

8. The one or more instances of computer-readable media of claim 7 wherein determination of the routing score further reflects:

one or more different factors that relate to the participant; and one or more different factors that relate to connections between the participant and other participants.

9. The one or more instances of computer-readable media of claim 7 wherein determination of the routing score further reflects any combination of factors among but not limited to:

a power level of a radio incorporated into the first participant computing system;

a capability level of a processor incorporated into the first participant computing system;

a utilization level of the processor incorporated into the first participant computing system;

system;

an amount of transient storage space available in the first participant computing system;

an amount of persistent storage space available in the first participant computing system;

an energy storage capacity of a battery incorporated into the first participant computing system;

a charge level of the battery incorporated into the first participant computing system;

a utilization level of some or all of connections between the participant and other participants;

a signal-to-noise ratio of some or all of connections between the participant and other participants;

a duty cycle of some or all of connections between the participant and other participants;

a data collision rate of some or all of connections between the participant and other participants;

participants;

an RF interference level of some or all of connections between the participant and other participants;

a received signal strength indication of some or all of connections between the participant and other participants; and a minimum number of hops via which the first participant computing system is able to connect to the wired Internet.

10. The one or more instances of computer-readable media of claim 7, the method further comprising:

transmitting a second signal encoding a participant computing system identifier of the first participant computing system and the determined routing score.

11. The one or more instances of computer-readable media of claim 7, the method further comprising:

comparing the determined routing score to a threshold;

based upon the comparison, determining that the determined routing score exceeds the threshold; and in response to determining that the determined routing score exceeds the threshold, storing an indication that the first computing system is a routing participant in the mesh network.

12. The one or more instances of computer-readable media of claim 11, the method further comprising:

transmitting a second signal encoding a participant computing system identifier of the first participant computing system and an indication that the first participant computing system has appointed itself a routing participant in the mesh network.

13. The one or more instances of computer-readable media of claim 11 wherein at least a portion of the received first signals also encode a routing score determined by the participant computing system having the contained identifier for the participant computing system having the contained identifier, the method further comprising:

determining the threshold based at least in part upon the routing scores encoded in the first signals directly received during a second period of time.

14. The one or more instances of computer-readable media of claim 11, the method further comprising:

in response to the stored indication that the first computing system is a routing participant in the mesh network, performing one or more routing functions in the mesh network.

15. The one or more instances of computer-readable media of claim 11 wherein a participant table containing information about each of a proper subset of the participants in the mesh network is stored by the first participant computing system, the method further comprising:

in response to the stored indication that the first computing system is a routing participant in the mesh network, expanding the set of participants in the mesh network about which the participant table stored by the first participant computing system contains information.

\* \* \* \* \*

UNITED STATES PATENT AND TRADEMARK OFFICE
CERTIFICATE OF CORRECTION

| | | |
|---|---|---|
| PATENT NO. | : 11,758,466 B2 | Page 1 of 1 |
| APPLICATION NO. | : 17/489437 | |
| DATED | : September 12, 2023 | |
| INVENTOR(S) | : Jacobs et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 94 days.

In the Claims

Column 25, Claim 3, Lines 14-15:
"other participants; participants;" should read: --other participants;--.

Column 26, Claim 9, Lines 19-20:
"computing system; system;" should read: --computing system;--.

Column 26, Claim 9, Lines 37-38:
"other participants; participants;" should read: --other participants;--.

Signed and Sealed this
First Day of April, 2025

Coke Morgan Stewart
*Acting Director of the United States Patent and Trademark Office*